(12) United States Patent
Stoeckl et al.

(10) Patent No.: US 12,715,713 B2
(45) Date of Patent: Aug. 25, 2026

(54) STAR WHEEL CONVEYOR FOR CONVEYING CONTAINERS IN A BEVERAGE FILLING SYSTEM

(71) Applicant: KRONES AG, Neutraubling (DE)

(72) Inventors: Fabian Stoeckl, Neutraubling (DE); Bruno Landler, Neutraubling (DE); Markus Schoenfelder, Neutraubling (DE); Tobias Ehrismann, Neutraubling (DE)

(73) Assignee: KRONES AG, Neutraubling (DE)

( * ) Notice: Subject to any disclaimer, the term of this patent is extended or adjusted under 35 U.S.C. 154(b) by 108 days.

(21) Appl. No.: 18/815,703

(22) Filed: Aug. 26, 2024

(65) Prior Publication Data

US 2025/0074718 A1 Mar. 6, 2025

(30) Foreign Application Priority Data

Aug. 30, 2023 (DE) ..................... 10 2023 123 402.1

(51) Int. Cl.
*B65G 47/84* (2006.01)
*B65G 29/00* (2006.01)

(52) U.S. Cl.
CPC ........... *B65G 47/846* (2013.01); *B65G 29/00* (2013.01); *B65G 2201/0235* (2013.01)

(58) Field of Classification Search
None
See application file for complete search history.

(56) References Cited

U.S. PATENT DOCUMENTS 5,046,599 A * 9/1991 Hamano ............... B67C 7/0046 198/481.1
8,056,705 B2 * 11/2011 Stauber .................. B65H 29/06 271/82
8,657,101 B2 * 2/2014 Zoni .................. B65G 47/5136 198/612

(Continued)

FOREIGN PATENT DOCUMENTS

CN 102730415 10/2012
DE 102021127132 4/2023

(Continued)

OTHER PUBLICATIONS

Search Report dated May 3, 2024, from German Application No. 10 2023 123 402.1, 6 pages.

*Primary Examiner* — Gene O Crawford
*Assistant Examiner* — Muhammad Awais
(74) *Attorney, Agent, or Firm* — Haynes and Boone, LLP

(57) ABSTRACT

A star wheel conveyor for conveying containers, for example for conveying containers in a beverage filling system, includes a conveyor segment rotatable about a central axis of rotation and at least one pair of pocket arms directed outward with respect to the axis of rotation for forming a pocket for at least partially receiving a container to be conveyed, wherein each pocket arm is arranged on the circumference of the conveyor segment and is pivotable about a pivot axis oriented substantially parallel to the axis of rotation, wherein the pocket arms engage with an adjustment part, which is arranged on the conveyor segment and is radially displaceable with respect to the axis of rotation, such that a pocket width of the pocket can be adjusted by displacing the adjustment part in the radial direction.

12 Claims, 16 Drawing Sheets

(56) References Cited

U.S. PATENT DOCUMENTS

| | | | | |
|---|---|---|---|---|
| 10,800,614 | B2 * | 10/2020 | Schulnig | B65G 47/846 |
| 11,325,793 | B2 * | 5/2022 | Bessard | B65G 29/00 |
| 2006/0042911 | A1 * | 3/2006 | Nakajima | B65G 47/847<br>198/463.1 |
| 2007/0271871 | A1 * | 11/2007 | Spence | B65G 29/00<br>53/201 |
| 2012/0260955 | A1 * | 10/2012 | Winzinger | B29C 49/42069<br>198/794 |
| 2014/0251754 | A1 * | 9/2014 | Hoellriegl | B29C 49/28008<br>198/345.1 |
| 2016/0355354 | A1 * | 12/2016 | Fahldieck | B65G 29/00 |
| 2022/0306401 | A1 * | 9/2022 | Leidel | B65G 47/847 |
| 2023/0150776 | A1 * | 5/2023 | Neubauer | B65G 54/02<br>414/800 |
| 2023/0173686 | A1 * | 6/2023 | Biondi | B25J 15/02<br>414/226.01 |
| 2023/0192419 | A1 * | 6/2023 | Biondi | B65B 65/006<br>198/459.2 |

FOREIGN PATENT DOCUMENTS

| | | | | |
|---|---|---|---|---|
| EP | 0355971 | | 2/1990 | |
| EP | 2093169 | | 8/2009 | |
| EP | 2093169 | A1 * | 8/2009 | B67C 7/0053 |
| EP | 3152138 | | 4/2017 | |
| EP | 4169857 | A1 * | 4/2023 | B65G 47/847 |
| JP | S518077 | A | 1/1976 | |
| WO | 2005030616 | | 4/2005 | |

* cited by examiner 1
2
4
6
8
10
12
14
15
16
18
20
22
40
42
43
44
45
46
48
49
50
51
52
54

4
18
54
40
16
56
58
14
20
64
68
60
66
62
70
22
74
10
8
2
1
6
R 1
2
4
8
10
14
16
40
24
24
43
45
15
42
28
10
6
32
46
R
12,13
44
6
28
10
78

6
10
8
42
28
46
16
40
R
12,13
46
4
44
45
24
15
24
32
2
14
30
82
1
40,44
78
80

16
40
15
43
14
45
44
46
51
50
42
49
48
52
18
54
2
8
10
R
8
1
6

2
22
86
4
88
8
10
1
2
6

STAR WHEEL CONVEYOR FOR CONVEYING CONTAINERS IN A BEVERAGE FILLING SYSTEM

CROSS-REFERENCE TO RELATED APPLICATIONS

This application claims priority from German Patent Application No. DE 10 2023 123 402.1, filed Aug. 30, 2023 in the German Patent and Trademark Office, the disclosure of which is incorporated herein by reference in its entirety.

TECHNICAL FIELD

The present invention relates to a star wheel conveyor for conveying containers, for example for conveying containers in a beverage filling system, which conveyor has a plurality of pockets that are rigid during a conveying operation.

RELATED ART

Star wheel conveyors are usually used on automated processing lines in beverage filling systems, for example at the end of a production line, to separate filled and closed containers at a given rate.

In order to be able to specify the rate, i.e., the frequency of transferring the containers or the distance between two consecutive containers, star wheel conveyors comprise a plurality of container receptacles evenly distributed around the circumference of a conveyor wheel, in which receptacles the containers to be conveyed are received during conveyance by the star wheel conveyor.

In principle, two fundamentally different types of star wheel conveyors can be distinguished with regard to the nature of their container holders, namely comprising, on the one hand, container holders in the form of clamps and, on the other hand, in the form of pockets.

The first type of star wheel conveyors has container holders which are configured as active or passive clamps. These clamps grip the container to be conveyed by actively or passively pivoting two clamp arms that can be pivoted relative to one another between an open position and a closed position during the conveying operation of the star wheel conveyor, i.e., during conveyance of containers to be conveyed, when the container is taken over and when the container is handed over. The open position allows the container to be held to be inserted into the clamp and removed from the clamp. In the closed position, the clamp fixes the container in a given position in the clamp so that conveying is possible. The container is held in position by gripping it via the clamp on the star wheel conveyor. The transition between the open position and the closed position of the clamp arms takes place either actively, i.e., controlled by an appropriate controller apparatus, or passively, by pushing the container into the clamp against a bias of the clamp arms. Accordingly, during the conveying operation of the star wheel conveyor, when the container to be conveyed is taken over from an apparatus upstream of the star wheel conveyor in the conveying direction of the container in the system into the clamp and also when the container conveyed by the star wheel conveyor is transferred from the clamp to an apparatus downstream of the star wheel conveyor, a clamp experiences a change in the position of its clamp arms—during the takeover at least from the open position to the closed position, and during the transfer from the closed position to the open position. Such a conveyor, which is formed with clamps for gripping a container, can be found, for example, in EP 2 093 169 A1.

This document deals with the second group or type of star wheel conveyors, which do not include clamps but pockets. In this document, "pockets" are understood to mean container holders which, in contrast to the clamps described above, do not experience any movement between different positions during the conveying operation of the star wheel conveyor. On the contrary, the pockets are preset in a setup process and remain in a rigid, fixed position during the actual operation of the star wheel conveyor and the latter's comprehensive filling system. The pockets therefore provide a receiving space that remains constant during the conveying operation, in which a container is at least partially received for conveying without being gripped by position changes of clamp arms, as is the case with clamps. The pocket width is therefore not adjusted during the conveyance of containers.

In order to allow a container to be conveyed in the conveying direction, the pocket comprises a rear pocket arm, as viewed in the conveying direction, which pushes the container to be conveyed from behind, as viewed in the conveying direction, when the conveyor wheel comprising the pocket rotates in the conveying direction. The container is pushed, possibly in cooperation with a guide provided radially on the outside with respect to the axis of rotation of the conveyor wheel, either over a rigid base plate of the star wheel conveyor, or the star wheel conveyor comprises a rotating base plate on which the conveyed container stands with its container base. To restrict the pocket at the front as seen in the conveying direction, the pocket can comprise an additional pocket arm.

Star wheel conveyors are widely used with substantially a disk-shaped conveyor wheel having a plurality of pockets provided around the circumference, which are evenly spaced from one another. The conveyor wheel of such star wheel conveyors typically comprises at least one pair of disk-like plates, which in a changeover mode can be rotated relative to one another about a central axis of rotation of the conveyor wheel. Rigid, radially outward-facing projections are arranged on the plates, each of which forms a pocket arm of a pocket. The projections of the one plate always form the pocket arm on one side of each pocket, for example always the rear pocket arm, and the projections of the other plate then always form the pocket arm on the other side of each pocket, for example always the front pocket arm. By rotating the plates relative to one another, a pocket width, i.e., a width of the pockets adapted to accommodate the type of container to be conveyed, more specifically to its container width or container diameter, can be preset in a plane perpendicular to the axis of rotation in the changeover mode. Such an apparatus can be found in EP 3 152 138 B1.

Furthermore, WO 2005/030616 A2 discloses an apparatus in which pocket arms are pivotably arranged on a pair of disks of a conveyor wheel via gear transmissions.

SUMMARY

An improved star wheel conveyor for conveying containers, for example, for conveying containers in a beverage filling system, is disclosed herein according to various embodiments.

Accordingly, a star wheel conveyor for conveying containers, for example for conveying containers in a beverage filling system, is proposed, comprising at least one conveyor segment or conveyor wheel segment rotatable about a central axis of rotation and at least one pair of pocket arms directed outward with respect to the axis of rotation for forming a pocket for at least partially receiving a container to be conveyed, wherein each pocket arm is arranged on the circumference of the conveyor segment and is pivotable relative to the conveyor segment about a pivot axis oriented substantially parallel to the axis of rotation.

The pocket arms engage with an adjustment part, which is arranged on the conveyor segment and is radially displaceable with respect to the axis of rotation, such that a pocket width of the pocket can be adjusted by displacing the adjustment part in the radial direction.

In other words, the two pocket arms forming the pocket engage with the adjustment part such that by moving the adjustment part, a width of the pocket formed by the pocket arms, which pocket lies in a plane perpendicular to the axis of rotation and is referred to herein as the pocket width and which is adapted to accommodate a type of container to be conveyed, more specifically is adapted to its container width or container diameter, can be adjusted. The width of the pocket is mainly defined by the distance between the pocket arms of a pocket. The pocket width of the pocket arms thus corresponds to a distance between the pocket arms in the circumferential direction relative to the axis of rotation. In other words, the pocket arms engage with the adjustment part, which is arranged on the conveyor segment and is radially displaceable with respect to the axis of rotation, such that by displacing the adjustment part in the radial direction, a distance between the pocket arms in the circumferential direction with respect to the axis of rotation, which distance defines the pocket width, can be adjusted.

By moving the adjustment part, both pocket arms of the pair of pocket arms can be pivoted at the same time.

The proposed star wheel conveyor thus constitutes a pocket star wheel conveyor in which the dimension, in particular the pocket width, of the pocket is fixed during conveying operation and in addition the container conveyed in the pocket is conveyed by simply pushing without any clamping force effect of the pocket arms and without movement of the pocket arms during conveying operation, in contrast to conveyor wheels with clamps in which a gripping process and a release process by pivoting the clamp arms of the clamp relative to one another take place during conveying operation to take over and hand over a container.

When the conveyor segment rotates about a central axis of rotation, the container in the pocket can be conveyed in the circumferential direction before it is released again at a defined location or a given angular position with respect to the axis of rotation, for example to a processing unit or to another conveyor.

The container can optionally be positioned in the pocket by being held between at least one contact surface of the pocket and a radially outwardly arranged, optional guide rail which can surround at least part of the circumference of the conveyor segment.

In order to adapt the star wheel conveyor from conveying containers having first dimensions to conveying containers having other dimensions, the adjustment part can optionally be moved in a changeover operation from its current position in which it was fixed at least during the conveying operation, so that the distance between the pocket arms of the pair is changed to another given value which corresponds to the containers having other dimensions. After adjusting the pocket arms to the new specified distance, the adjustment part can be fixed in its position again. After fixing the adjustment part—and thus the pocket arms—in the new fixed position, it is possible to switch back to conveying operation. This means that the pocket width can be adapted to the container being transported in each case, more specifically to its container width or container diameter.

The conveyor segment can be formed over a given angle of extent relative to the axis of rotation. In other words, the conveyor segment can extend over a given arc, i.e., a given circular segment. The angle of extent can be, for example, 45°, 60°, 90°, 120° or 180°, without being limited thereto.

The star wheel conveyor comprises at least one conveyor segment. In one embodiment, the conveyor segment can extend over the full angle of 360° around the axis of rotation, i.e., it can be configured as a circular disk or a circular ring, which can be continuous in the circumferential direction or can extend over the entire circumference.

A conveyor segment extending over the entire circumference can be understood as a conveyor wheel.

The star wheel conveyor can also comprise a plurality of conveyor segments adjoining one another in the circumferential direction, which together can form an optionally continuous conveyor wheel. In other words, the star wheel conveyor can comprise a conveyor wheel that is rotatable about the axis of rotation and that is segmented, i.e., made up of the conveyor segments.

According to an optional embodiment, the two pocket arms of the pair of pocket arms forming the pocket can engage with the adjustment part such that the pocket arms can be pivoted in opposite directions to one another by displacing the adjustment part in the radial direction. Thus, the width of the pocket can be easily changed by radially moving the adjustment part, wherein in the case of containers of different sizes, their central axis can always be positioned substantially at the same point in relation to the circumferential direction and, if the pocket arms are configured accordingly, also at the same point in the radial direction. This embodiment allows for a substantially symmetrical widening and narrowing of the pocket width.

According to a further optional embodiment, the star wheel conveyor can be configured such that the position of the pocket arms of the pair of pocket arms forming the pocket can be preset to a given position in a changeover mode and that the pair of pocket arms is fixed in the preset position during a conveying operation in which containers to be conveyed are conveyed.

The two pocket arms of the pair of pocket arms forming the pocket can engage with the adjustment part such that when the adjustment part is displaced in a first direction, for example a direction pointing radially outward with respect to the axis of rotation, the pocket arms are pivoted toward one another, and when the adjustment part is displaced in a second direction opposite to the first direction, i.e., a direction pointing radially inward with respect to the axis of rotation according to the example mentioned, the pocket arms are pivoted away from one another.

Optionally, the pocket arms can each comprise a pocket portion intended for forming the pocket, which portions can each form a contact surface for the container held in the pocket. The pocket width corresponds to the width of the pockets at the level of the contact surfaces.

Accordingly, the two pocket arms of the pair of pocket arms forming the pocket can then engage with the adjustment part such that when the adjustment part is displaced in the first direction, for example radially outward, the pocket portions of the pocket arms intended for forming the pocket are pivoted toward one another, and when the adjustment part is displaced in the second direction, i.e., for example, radially inward, the pocket portions are pivoted away from one another.

According to an optional embodiment, the two pocket arms of the pair of pocket arms forming the pocket can each engage with the adjustment part via an interaction element, wherein the interaction element can optionally be guided in a slot groove in the adjustment part, for example in the form of a pin element engaging with the slot groove. The interaction element can be oriented parallel to the pivot axis of the pocket arm and/or extend away from the pocket arm parallel to the pivot axis of the pocket arm.

Alternatively or additionally, the interaction element can be formed integrally with the pocket arm. Alternatively, the interaction element may be a separate part attached to the pocket arm.

The slot grooves in the adjustment part can be arranged in the adjustment part, for example in relation to or with their respective longitudinal extension, each oriented at an angle to the direction of movement of the adjustment part (the radial direction). The slot grooves can optionally be arranged axially symmetrically in the adjustment part with respect to the direction of movement and/or a direction radial to the axis of rotation.

The guide groove can specify or, in other words, define a trajectory at least between a radial inner point and a radial outer point, which trajectory extends obliquely outward with respect to the axis of rotation.

In this document, the terms "radial inner point" and "radial outer point" are to be understood to mean that the radial inner point lies on a smaller radius with respect to the axis of rotation than the radial outer point. The radial inner point therefore has a smaller radial distance to the axis of rotation than the radial outer point.

The expression "extend obliquely outward with respect to the axis of rotation" means that the trajectory runs from the radial inner point to the radial outer point at an angle greater than 0° and less than 90° to the circumferential direction and that the trajectory runs from the radial inner point to the radial outer point at an angle greater than 0° and less than 90° to the radial direction. This can be achieved by arranging the radial inner point and the radial outer point offset from one another with respect to the circumferential direction of the axis of rotation. In other words, the radial inner point and the radial outer point have correspondingly different angular positions relative to the axis of rotation. In other words, a straight line oriented perpendicular to the axis of rotation, which straight line extends between the axis of rotation and the radial inner point, and a straight line oriented perpendicular to the axis of rotation, which straight line extends between the axis of rotation and the radial outer point, enclose an angle greater than 0°.

In this document, "extend obliquely outward with respect to the axis of rotation" thus means that a virtual straight line extending between the radial inner point and the radial outer point encloses an angle greater than 0° and less than 90° with the circumferential direction at the radial inner point, more specifically with a tangent of the circumferential direction of the axis of rotation at the radial inner point. According to optional embodiments, the angle can be less than or equal to 60°, in one embodiment less than or equal to 45°, for example less than or equal to 30° and in another example less than or equal to 20°, less than or equal to 15° or even less than or equal to 10°. The smaller the angle of inclination relative to the circumferential direction, more specifically the angle enclosed by the trajectory or straight line between the radial inner point and the radial outer point and the tangent of the circumferential direction at the radial inner point, the lower the resulting adjustment forces move the adjustment part and, accordingly, the lower the abrasion on the present sliding surfaces.

The trajectory can be at least partially linear, i.e., straight. The slot groove can therefore be at least partially a linear slot. The trajectory can moreover also be at least partially curved. The slot groove can therefore be at least partially a curved slot. The curvature of the trajectory along its curved path can have a constant value or can vary along its path.

According to an optional embodiment, the conveyor segment can comprise a disk segment which is rotatable about the axis of rotation relative to the adjustment part and which engages with the adjustment part such that a rotation of the disk segment about the axis of rotation relative to the adjustment part causes a displacement of the adjustment part in the radial direction.

The conveyor segment can comprise at least one disk segment. In one embodiment, the disk segment can extend over the full angle of 360° around the axis of rotation, i.e., it can be configured as a circular disk or a circular ring, which angle can be continuous in the circumferential direction or can extend over the entire circumference. A disk segment extending over the entire circumference can therefore form a circular disk or annular disk.

The star wheel conveyor can comprise a plurality of circumferentially adjacent disk segments, which together form an optionally continuous disk part. In other words, the star wheel conveyor can comprise a wheel-shaped disk part that is rotatable about the axis of rotation and that is segmented, i.e., made up of the disk segments.

The disk segment can be configured as a ring segment. The disk segment can be formed in the circumferential direction over a given angle of extent relative to the axis of rotation. In other words, the disk segment can extend over a given arc, i.e., a given circular segment. The angle of extent can be, for example, 45°, 60°, 90°, 120° or 180°, without being limited thereto.

In one embodiment, the disk segment can extend over the angle of extent of the conveyor segment. In other words, the angle of extent of the disk segment can substantially correspond to the angle of extent of the conveyor segment. Optionally, the sum of the angle of extent of the disk segment and of the angle of movement of the disk segment in the circumferential direction can substantially correspond to the angle of extent of the conveyor segment, optionally minus a given amount.

The position and movement of the adjustment part can be achieved in a particularly simple and robust manner if, according to an optional embodiment, the disk segment comprises a guide groove in which a guide shoulder projecting from the adjustment part is guided. The guide groove can specify a trajectory at least between a radial inner point and a radial outer point, which trajectory extends obliquely outward with respect to the axis of rotation.

In this document, the terms "radial inner point" and "radial outer point" and the expression "extend obliquely outward with respect to the axis of rotation" are to be understood consistently as described above. According to optional embodiments, the angle of inclination of the guide groove with respect to the circumferential direction, more specifically the angle that the trajectory or straight line between the radial inner point and the radial outer point encloses with the tangent of the circumferential direction at the radial inner point, can be less than or equal to 60°, in some embodiments less than or equal to 45°, for example less than or equal to 30° and in another example less than or equal to 20°, less than or equal to 15° or even less than or equal to 10°. The smaller the angle of inclination relative to the circumferential direction, the lower the resulting adjustment forces move the adjustment part and the disk segment relative to one another and, accordingly, the lower the abrasion on their sliding surfaces with which they are in contact with one another.

The trajectory of the guide groove can be at least partially linear, i.e., straight. The trajectory can moreover also be at least partially curved. The curvature of the trajectory along its curved path can have a constant value or can vary along its path.

Optionally, a radially outwardly oriented punch can be arranged between the pair of pocket arms, which punch is configured to form the pocket together with the pair of pocket arms. In particular, the punch may specify a depth of the pocket in the radial direction relative to the axis of rotation. The punch can provide an additional contact point or contact region for the container conveyed by the pocket. Hence, when the pocket is formed by the pocket arms and the punch, at least three contact surfaces can be provided for the conveyed container via which the container conveyed by the pocket is in contact with the pocket.

The punch is arranged on the conveyor segment so as to point radially outward with respect to the axis of rotation. It therefore constitutes a radial stop radially inward relative to the axis of rotation for a container positioned in the pocket. In other words, the radial punch limits the depth of the pocket in the direction of the axis of rotation.

The radial punch can be arranged on the adjustment part, wherein it is optionally formed integrally with the adjustment part. Alternatively, the punch can also be connected to the adjustment part as a separate part.

According to an optional embodiment, the radial punch can be displaceable in the radial direction to the axis of rotation relative to the conveyor segment, the adjustment part and/or the pair of pocket arms. For example, the punch can engage with a disk segment that is rotatable about the axis of rotation relative to the punch such that a rotation of the disk segment about the axis of rotation relative to the punch causes a displacement of the punch in the radial direction. In order to achieve a particularly simple structure of the star wheel conveyor, the punch and the adjustment part can engage with the same disk segment.

In order to control the position of the radial punch, the disk segment engaging with the punch can comprise a punch guide groove in which a punch guide shoulder projecting from the punch is guided. The punch guide groove may specify a trajectory at least between a radial inner point and a radial outer point, which trajectory extends obliquely outward with respect to the axis of rotation.

In order to reduce the effort associated with cleaning the proposed star wheel conveyor, the conveyor segment can comprise a seal which provides sealing in the radial direction between a pocket-forming region of the pocket arms and/or of the punch, which region is present radially outside the seal, and a conveyor segment interior which is present radially inside the seal.

It has proven to be advantageous if, according to an optional embodiment, the adjustment part, the interaction elements, the at least one disk segment, the guide shoulder, the punch guide shoulder, the guide groove and/or the punch guide groove are arranged inside the conveyor segment.

The seal can optionally be a seal running around the circumference of the conveyor segment. The seal may optionally extend over the entire circumference relative to the axis of rotation.

Alternatively or additionally, the seal can be a diaphragm seal and/or bellows-type seal. The seal can comprise at least one boot region and/or one bellows region.

The interior of the conveyor segment can be a mechanical region, i.e., a region in which the components move the pocket arms and, if applicable, the punch are arranged in engagement with one another to achieve mobility. The seal can be used to seal this space, making the star wheel conveyor ideal for aseptic filling systems, for example.

The disk segment can comprise an actuating unit for adjusting the position of the disk segment relative to the adjustment part. For example, the disk segment can comprise a toothed portion, optionally on a radially inner side of the disk segment, for example when the disk segment is formed in the shape of a ring segment. This toothed portion can engage with a pinion of the actuating unit. The actuating unit may be manually operated. Alternatively or additionally, the actuating unit can also comprise a drive, for example an electric motor. The actuating unit can be connected to a controller of the star wheel conveyor. Furthermore, it can be connected to a central controller of the system comprising the star wheel conveyor. For example, an input that requires an adjustment of the pocket size can be made at a human-machine interface that is located outside of a conveying chamber, for example a clean room in which the containers are conveyed by the pockets. The changeover process on the star wheel conveyor for this purpose can therefore be carried out particularly quickly and without damaging the atmosphere of the conveying chamber.

Alternatively or additionally, the actuating unit can be configured to be self-locking. For example, the actuating unit can comprise an active or passive self-locking element. The actuating unit can, for example, comprise a self-locking worm.

The actuating unit can further comprise an actively controlled bolt clamping mechanism.

The star wheel conveyor can further comprise a radial outer guide which provides support and guidance, with respect to the pocket, of the container guided in the pocket radially outside the conveyor segment. The guide can comprise a substantially curved guide rail, which optionally extends substantially at a given radius to the axis of rotation in the circumferential direction.

The star wheel conveyor can further comprise a rigid base plate over which a container conveyed by the pocket can be pushed. Alternatively, the star wheel conveyor can comprise a rotating base plate on which the container being conveyed rests with its container base during conveying.

BRIEF DESCRIPTION OF THE FIGURES

Further embodiments of the invention are explained in more detail by the following description of the figures, in which.

DETAILED DESCRIPTION

Various embodiments are described below with reference to the figures. Identical, similar, or identically acting elements are provided with identical reference signs in the various figures, and a repeated description of these elements is in some cases omitted in order to avoid redundancies.

Figure 1:
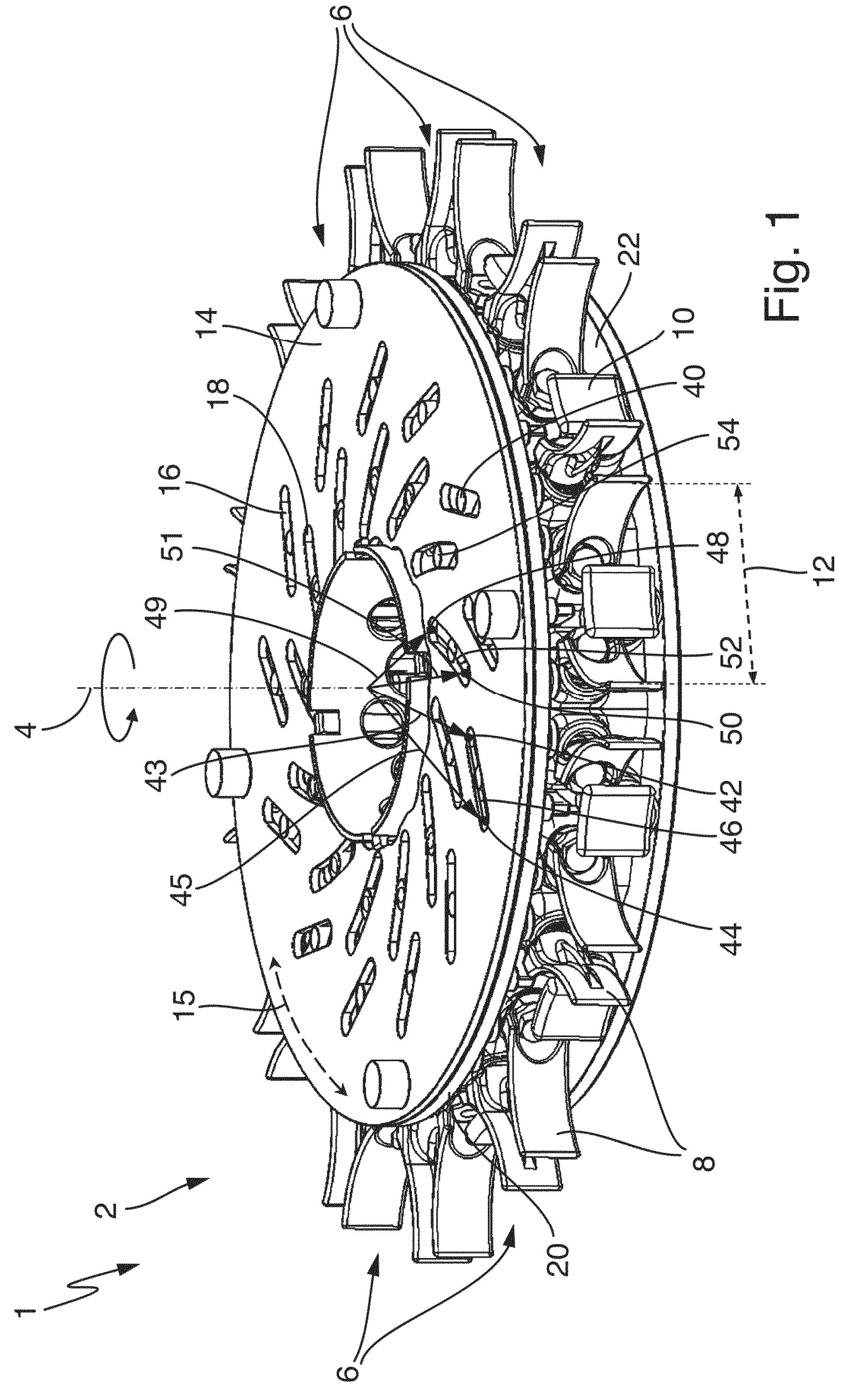
FIG. 1 schematically shows a conveyor segment of a star wheel conveyor for conveying containers in a beverage filling system.

FIG. 1 schematically shows a conveyor segment 2 of a star wheel conveyor 1 for conveying containers in a beverage filling system.

The conveyor segment 2 is rotatable about a central axis of rotation 4 and extends completely around the axis of rotation 4. The conveyor segment 2 thus constitutes a conveyor wheel.

A plurality of radially outward-directed pockets 5 are arranged on the conveyor segment 2, each of which is configured to partially accommodate a container to be conveyed (not shown). Each pocket 6 is formed from a pair of pocket arms 8 directed outward with respect to the axis of rotation 4 and an optional radial punch 10 arranged centrally between the pair of pocket arms 8 and radially displaceable with respect to the axis of rotation 4.

The pocket arms 8 define, by their distance 12, the width of the pocket 6 in the circumferential direction, i.e., the pocket width 13 of the pocket 6 perpendicular to the axis of rotation 4. The depth of the pocket 6 in the radial direction is given in particular by the position of the punch 10, but can also be given by the shape of the pocket arms 8.

With the pocket arms 8 and the punch 10, the pocket 6 thus comprises three contact surfaces with which the pocket 6 comes into contact with the container during conveyance of the container. The pocket width 13 extends between the contact surfaces of the pocket arms 8.

Optionally, a radially inward-directed, optionally curved outer guide (not shown) for guiding the container with respect to the pockets 6 can be arranged radially outside the conveyor segment 2. The container is then conveyed accordingly between pocket 6 and the outer guide.

The conveyor segment 2 further comprises a disk segment 14 that is rotatable about the axis of rotation 4 relative to the other components of the conveyor segment 2. The displacement capacity of the disk segment 14 is indicated by the movement arrow 15.

The disk segment 14 extends completely around the axis of rotation 4 and thus constitutes a circular disk.

According to this embodiment, the pocket arms 8 are arranged between an upper plate segment 20 in the form of an annular disk and a lower plate segment 22 in the form of an annular disk so as to be pivotable relative thereto. The disk segment 14 is optionally arranged above the upper plate segment 20 so as to be movable relative thereto. The plate segments 20, 22 can be understood as base bodies of the conveyor segment 2.

A plurality of grooves 16, 18 is provided in the disk segment 14, which grooves, in a changeover mode of the star wheel conveyor, allow for the position of the pocket arms 8 and the punch 10 to be adjusted, wherein they are coupled to the pocket arms 8 and punch 8 for changing the position of the pocket arms 8 and punch 10, as described in more detail below.

Each pocket 6 is assigned a slot-shaped guide groove 16, which is provided for specifying the position of the pocket arms 8, and each is assigned a slot-shaped punch guide groove 18, which is provided for specifying the position of the punch 10.

Figure 2:
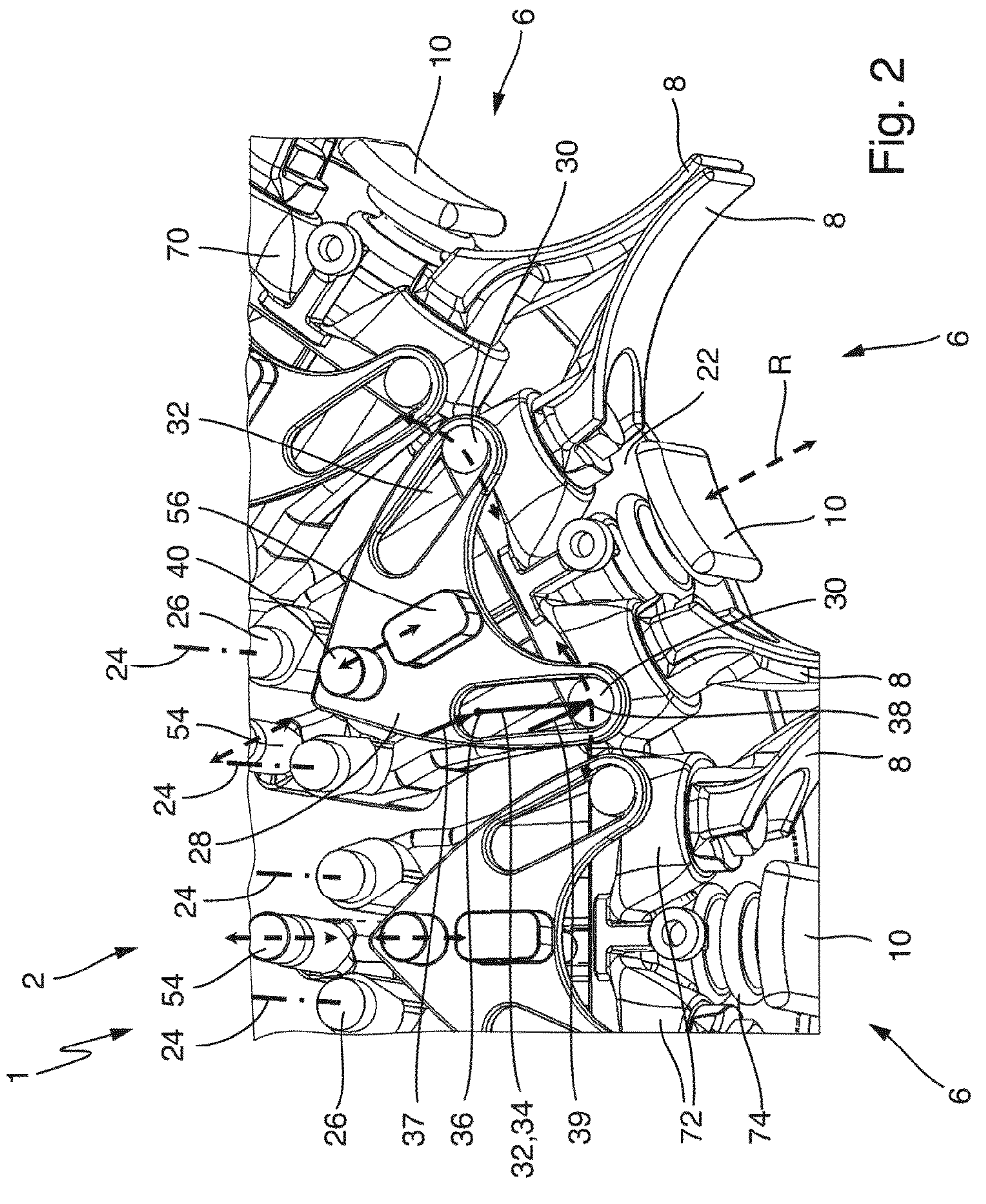
FIG. 2 schematically shows a perspective side view of a detail of the star wheel conveyor of FIG. 1.

FIG. 2 schematically shows a perspective side view of a detail of the star wheel conveyor 1 of FIG. 1. In this view, the disk segment 14 and the upper plate segment 20 located below the disk segment 14 are hidden.

Accordingly, it can be seen that each pocket arm 8 of the pockets 6 on the circumference of the conveyor segment 2 can be pivoted about a pivot axis 24 oriented substantially parallel to the axis of rotation 4. For this purpose, each pocket arm 8 comprises a lower and an upper pivot bearing portion 26, by means of which it is rotatably engaged in corresponding pivot bearing portions in the upper and lower plate segments 20, 22.

The pocket arms 8 of each of the pairs of pocket arms 8 are each engaged with an adjustment part 28, which is arranged on the conveyor segment 2 and is radially displaceable with respect to the axis of rotation 4, such that by displacing the adjustment part 28 in the radial direction R, the distance 12 between the pocket arms 8 in the circumferential direction with respect to the axis of rotation 4 and thus the width or pocket width 13 of the pocket 6 can be adjusted.

According to the optional embodiment shown herein, the two pocket arms 8 of the pair of pocket arms 8 forming the pocket 6 are each engaged with the adjustment part 28 via an interaction element 30, wherein the interaction elements 30 are configured herein as pin elements extending parallel to the pivot axis 24 and are each guided such as to engage in a slot groove 32 provided in the adjustment part 28. In the present case, the interaction element 30 is formed integrally on the pocket arm 8.

The slot grooves 32 in the adjustment part 28 are arranged in the adjustment part 28 with their respective longitudinal extension each oriented at an angle to the direction of movement of the adjustment part 28, i.e., to the radial direction R. Accordingly, they extend diagonally outward. The slot grooves 32 are arranged axially symmetrically in the adjustment part 28 with respect to the radial direction R.

The longitudinal extension of the slot grooves 32 each provides a trajectory 34 for the interaction element 30 guided therein. In other words, the longitudinal extension and the trajectory are the same. Each slot groove 32 extends between a radial inner point 36 and a radial outer point 38 and thereby defines the trajectory 34, which extends obliquely outward with respect to the axis of rotation 4 in a plane perpendicular to the axis of rotation 4.

The radial inner point 36 has a radius 37 relative to the axis of rotation 4 which is smaller than the radius 39 which the radial outer point 36 has. The radial inner point 36 therefore has a smaller radial distance to the axis of rotation 4 than the radial outer point 38. Moreover, the radial inner point 36 and the radial outer point 38 are offset from one another with respect to the circumferential direction of the axis of rotation 4. The trajectory 34 therefore extends obliquely outward with respect to the axis of rotation 4. It therefore has a component in the circumferential direction and a component in the radial direction R.

The trajectory 34 of the slot grooves 32 is linear in this embodiment. Slot groove 38 is therefore a linear slot.

Here, the two pocket arms 8 of the pair of pocket arms 8 forming the pocket 6 are engaged with the adjustment part 28 such that when the adjustment part 28 is displaced radially outward, the pocket arms 8 are pivoted toward one another, and when the adjustment part 28 is displaced radially inward, the pocket arms 8 are pivoted away from one another.

The adjustment part 28 further comprises a guide shoulder 40 which projects in the direction of the axis of rotation 4 and the direction of the pivot axes 24 and thus perpendicular to the radial direction R representing the direction of movement of the adjustment part 28, and which is guided in the guide groove 16 in the disk segment 14 (see FIG. 1).

The radial punch 10 is displaceable in the radial direction R relative to the adjustment part 28 and the pair of pocket arms 8. It is in engagement with the punch guide groove 18 of the disk element 14 via a punch guide shoulder 54 extending in the direction of the axis of rotation 4 (see FIG. 1).

As shown in FIG. 1, the guide groove 16 extends between a radial inner point 42, which is located on a first radius 43, and a radial outer point 44, which is located on a second radius 45 that is larger than the first radius 43. Furthermore, the first point 42 and the second point 44 are offset from one another in the circumferential direction. Accordingly, the guide groove 16 has a trajectory 46 which extends obliquely outward with respect to the axis of rotation 4 in a plane perpendicular to the axis of rotation 4.

Analogously, the punch guide groove 18 extends between a radial inner point 48, which is located on a first radius 49, and a radial outer point 50, which is located on a second radius 51 that is larger than the first radius 49. Furthermore, the first point 48 and the second point 50 are offset from one another in the circumferential direction. Accordingly, the punch guide groove 18 has a trajectory 52 which extends obliquely outward with respect to the axis of rotation 4 in a plane perpendicular to the axis of rotation 4.

Figure 3:
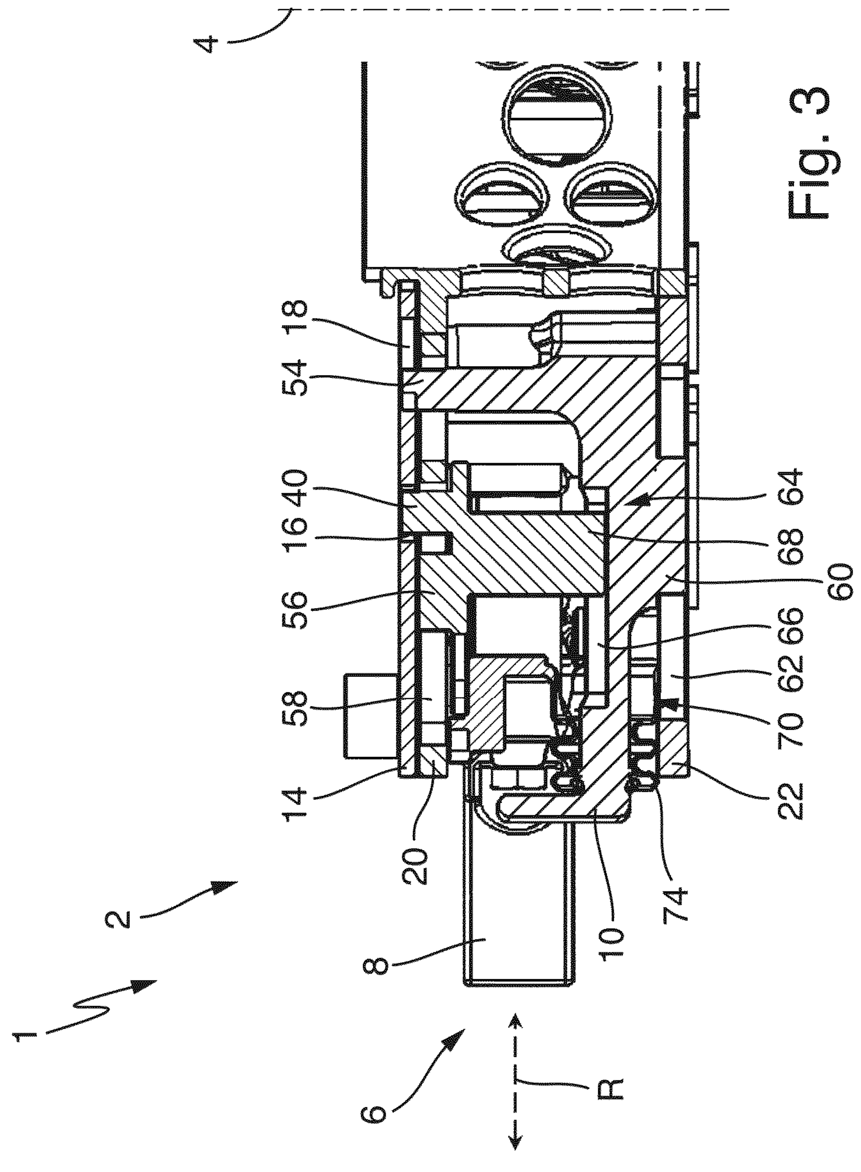
FIG. 3 schematically shows a sectional view through a conveyor segment of the star wheel conveyor of FIG. 1.

As can be seen in FIG. 2, the adjustment part 28 comprises a radially oriented guide portion 56 which is guided in a radially oriented slot guide 58 in the upper plate segment 20 in the radial direction R (see FIG. 3).

FIG. 3 schematically shows a sectional view through the conveyor segment 2 from FIG. 1 in a plane defined by the radial direction R and the axis of rotation 4, centrally through a pocket 6. One can see once again, among other things, the radial guidance of the adjustment part 28 relative to the upper plate segment 20 via the guide portion 56, which is designed like a key, and the slot guide 58.

One can also see that the radial punch 10 is guided in the radial direction R relative to the lower plate segment 22, namely, according to this embodiment, in that the radial punch 10 is in engagement with a radially oriented slot guide 62 via a radially oriented, key-like guide portion 60.

Moreover, the punch 10 and the adjustment part 28 have a mutual radial guide 64, in this case formed by a key-like guide shoulder 68 on the adjustment part 28, which is guided in a slot guide 66 in the punch 10.

The key-like shape provides anti-twisting protection for the components guided by the key-like components.

As can be seen in FIGS. 1 to 3, the conveyor segment 2 comprises a seal 70 which provides sealing in the radial direction R between a pocket-forming region of the pocket arms 8 and of the punch 10, i.e., of the pockets 6, which region is present radially outside the seal 70, and a conveyor segment interior which is present radially inside the seal 70.

In the present case, the adjustment part 28, the interaction elements 30, the disk segment 14, the guide shoulder 40, the punch guide shoulder 54, the guide groove 16 and the punch guide groove 18 are arranged inside the conveyor segment.

The seal 70 is configured to run around the circumference of the conveyor segment 2. It is configured as a diaphragm seal with boot portions 72 and bellows portions 74. The bellows portions 74 allow for radial mobility of the punch 10 within its range of motion specified by the disk segment 14. The boot portions 72 allow for the pocket arms 8 to pivot within the range of motion specified by the disk segment 14.

The seal 70 thus divides the conveyor segment in the circumferential radial direction R into an outer region of the conveyor segment, in which the pockets 6 are arranged, and the interior of the conveyor segment, in which the mechanical components required for the movement of the pocket arms 8 and the punch 10, i.e., those components which engage with one another to realize the mobility of the pocket arms 8 and the punch 10, are arranged.

Figure 4:
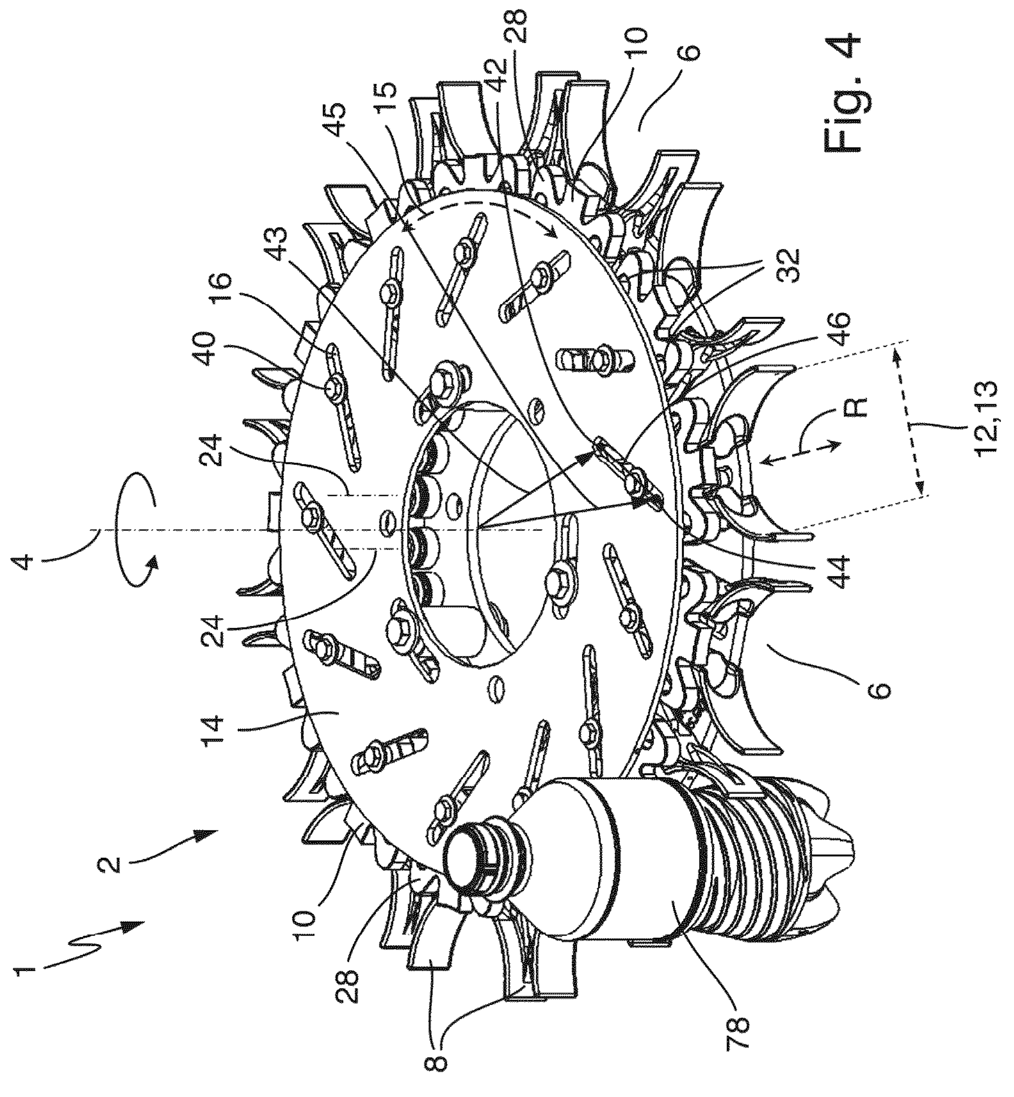
FIG. 4 schematically shows a perspective sectional view of a star wheel conveyor for conveying containers in a beverage filling system according to another embodiment.

FIG. 4 schematically shows a perspective sectional view of a star wheel conveyor 1 for conveying containers 78 in a beverage filling system according to another optional embodiment. The star wheel conveyor 1 substantially corresponds to that of FIGS. 1 to 3, wherein the radial punch 10 is formed herein integrally with the adjustment part 28. Accordingly, the disk segment 14 of the embodiment of FIG. 4 does not comprise a punch guide groove 18. A conveyed container 78 is shown as an example.

Figure 5:
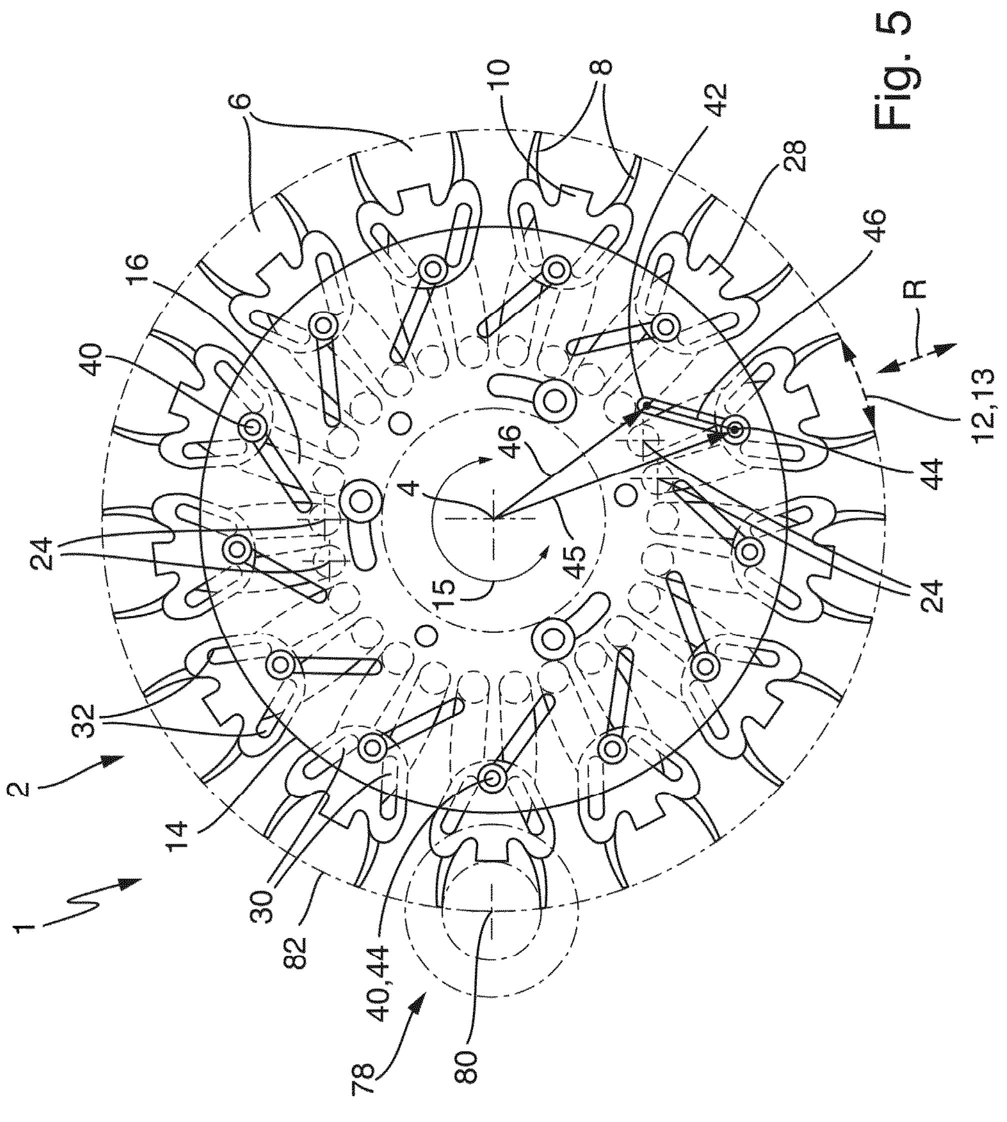
FIG. 5 schematically shows a top view of the star wheel conveyor of FIG. 4, wherein pockets of the star wheel conveyor have a minimum pocket size.
Figure 6:
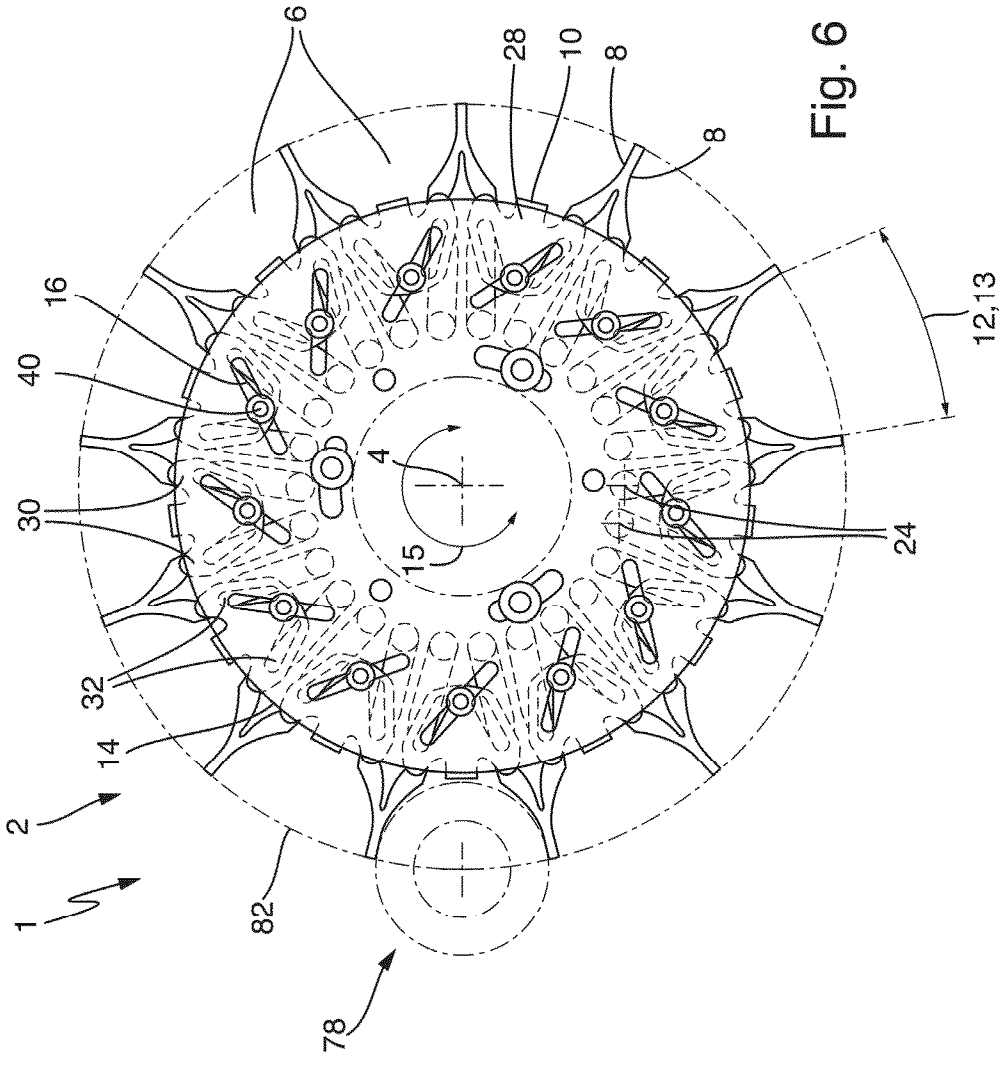
FIG. 6 schematically shows a top view of the star wheel conveyor of FIG. 4, wherein pockets of the star wheel conveyor have a maximum pocket size.

FIGS. 5 and 6 each schematically show a top view of the star wheel conveyor 1 of FIG. 4, wherein the pockets 6 in FIG. 5 have a minimum pocket size, and the pockets in FIG. 6 have a maximum adjustable pocket size.

In the setting of the pockets 6 shown in FIG. 5, they are adjusted to accommodate a container 78 with the smallest intended diameter, as indicated in FIG. 5 on the left by the smallest of the concentric circles. It corresponds to the smallest intended pocket width 13 of the pockets 6. The concentric circles represent containers 78 of different sizes, which can alternatively be conveyed by the star wheel conveyor 1. In FIG. 5, the adjustment part 28 is positioned in its maximum extended position, which is specified by the guide shoulder 40 located at the radial outer point 44 of the guide groove 16.

In the setting of the pockets 6 shown in FIG. 6, they are adjusted to accommodate a container 78 with the maximum intended diameter, as indicated in FIG. 6 on the left by the greatest of the concentric circles. It corresponds to the maximum intended pocket width 13 of the pockets 6. The adjustment part 28 is in its maximum retracted position. Accordingly, the pocket arms 8 have been pivoted away from one another in opposite directions from their position in FIG. 5 via their pivot axes 24. The distance 12 and thus the pocket width 13 is limited here by the collision of the pocket arms 8 of two adjacent pockets 6.

To change the pocket size from the arrangement according to FIG. 5 to the arrangement according to FIG. 6, the disk segment 14 must be rotated clockwise about the axis of rotation 4 by a given angular amount with reference to the top views in FIGS. 5 and 6.

As can be seen when comparing FIGS. 5 and 6 and as indicated by means of the concentric circles symbolizing the containers 78 of different sizes, regardless of the set size of the pockets 6, the central axis 80 of the containers 78 of all container sizes can be positioned substantially on the same pitch circle diameter 82 when the containers 78 are conveyed by means of the pockets 6.

Figure 7:
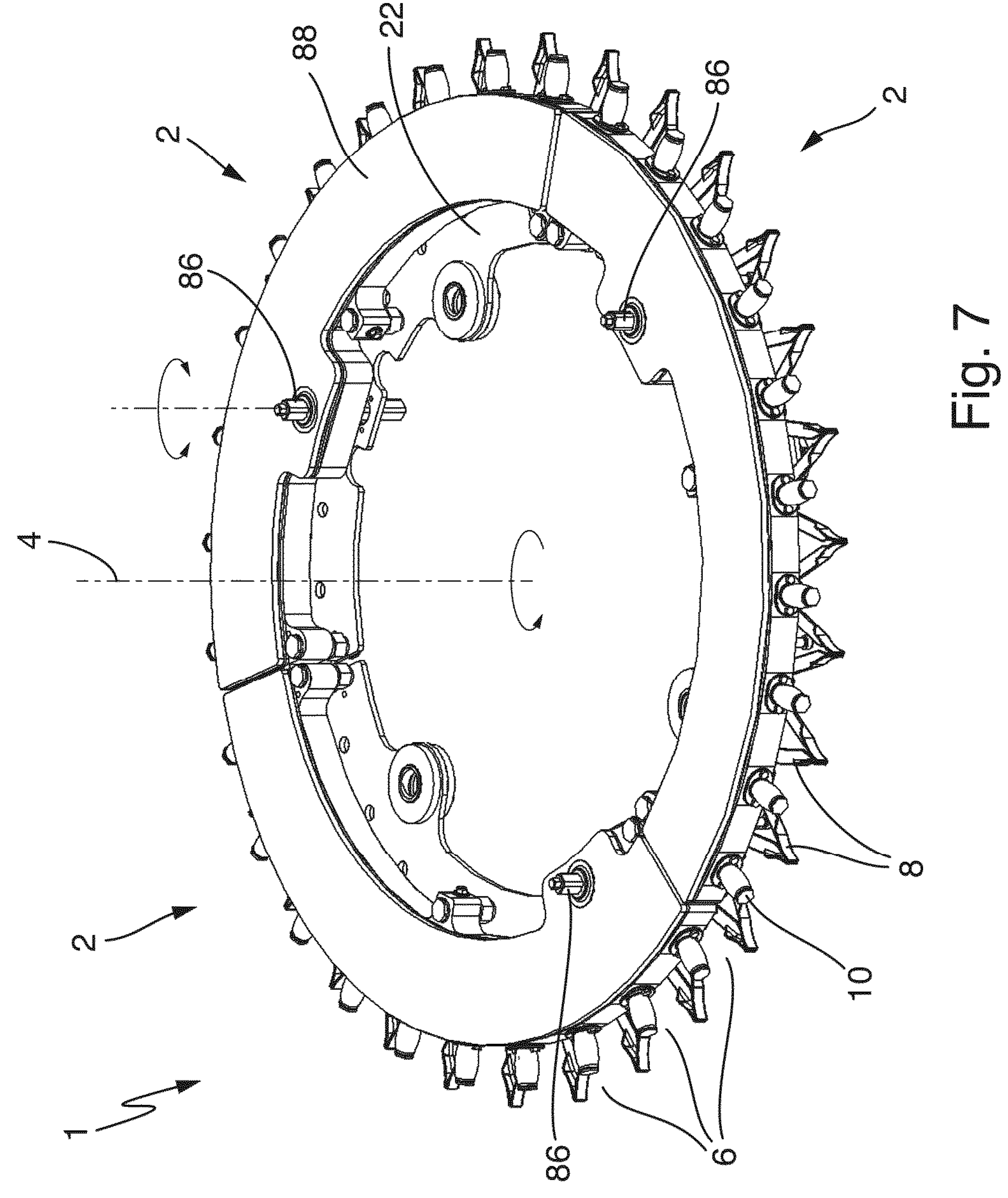
FIG. 7 schematically shows a perspective sectional view of a star wheel conveyor for conveying containers in a beverage filling system according to another embodiment.

FIG. 7 schematically shows a perspective sectional view of a star wheel conveyor 1 for conveying containers 78 in a beverage filling system according to another optional embodiment. The star wheel conveyor 1 substantially corresponds to that of FIGS. 1 to 3, wherein three conveyor segments 2 are provided here, each of which extends over an angle of extent of approximately 120° and which together form a conveyor wheel that is substantially continuous in the circumferential direction. The conveyor segments 2 are each sealed on all sides from the environment and connected to one another at the circumferential end faces. Each conveyor segment 2 has a cover plate 88 for the purpose of providing sealing from above.

Figure 8:
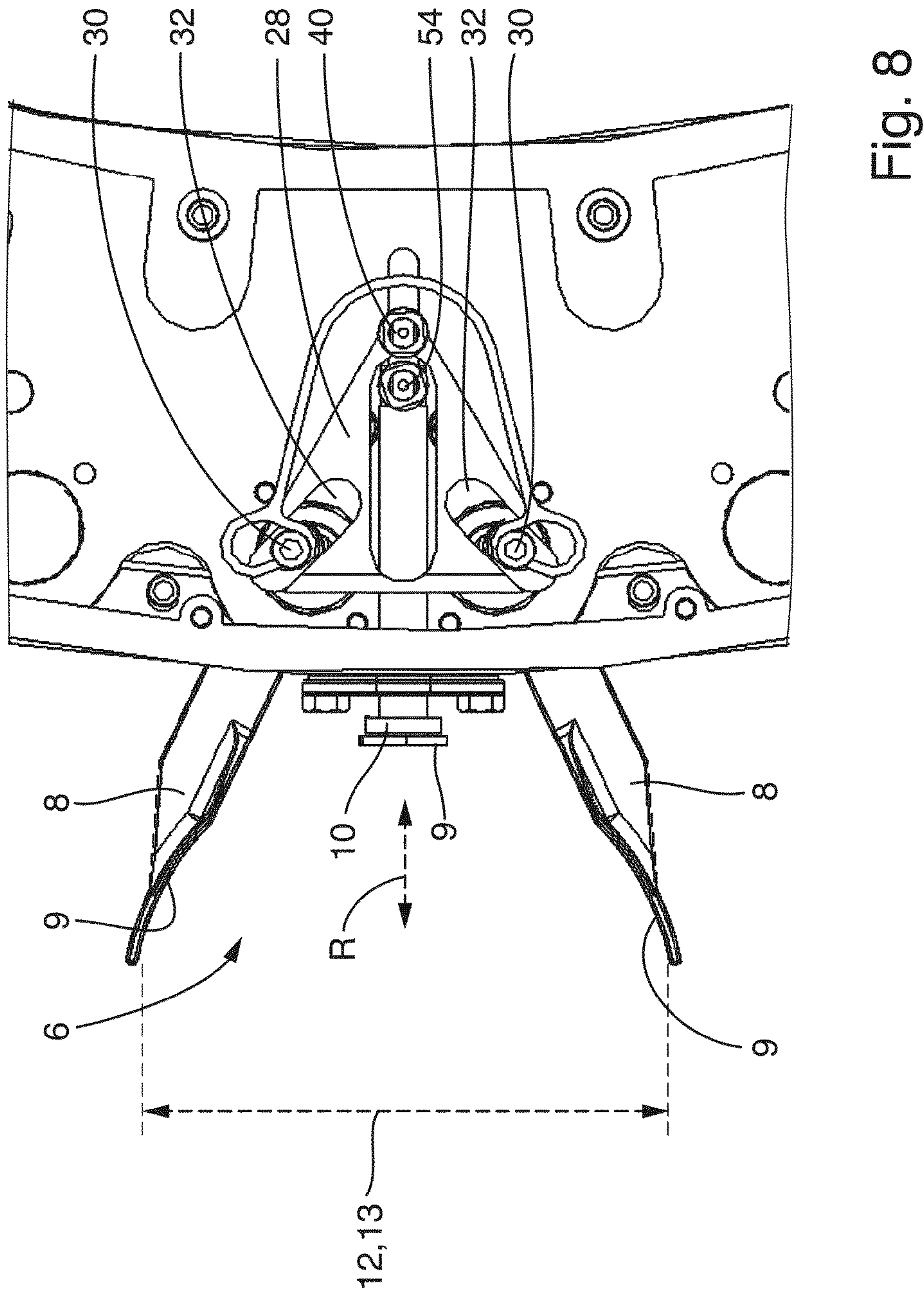
FIG. 8 schematically shows a top view of a detail of a conveyor segment of the star wheel conveyor of FIG. 7.

FIG. 8 schematically shows a top view of a detail of a conveyor segment 2 of the star wheel conveyor 1 of FIG. 7, wherein the cover plate 88, an upper plate segment 20 (see FIG. 11) and the disk segment (see FIGS. 9 and 10) are hidden in order to allow a view of the adjustment part 28 and the part of the punch 10 arranged inside the conveyor segment. The adjustment part 28, in turn, comprises the obliquely outwardly extending slot grooves 32 in which the interaction elements 30 of the pocket arms 8 are guided.

It can also be seen that in this embodiment the punch guide shoulder 54 is arranged radially outside the guide shoulder 40 of the adjustment part 28.

The contact surfaces of the pocket 6, which surfaces are provided by the pocket arms 6 and the radial punch 10, are indicated by reference sign 9.

Figure 9:
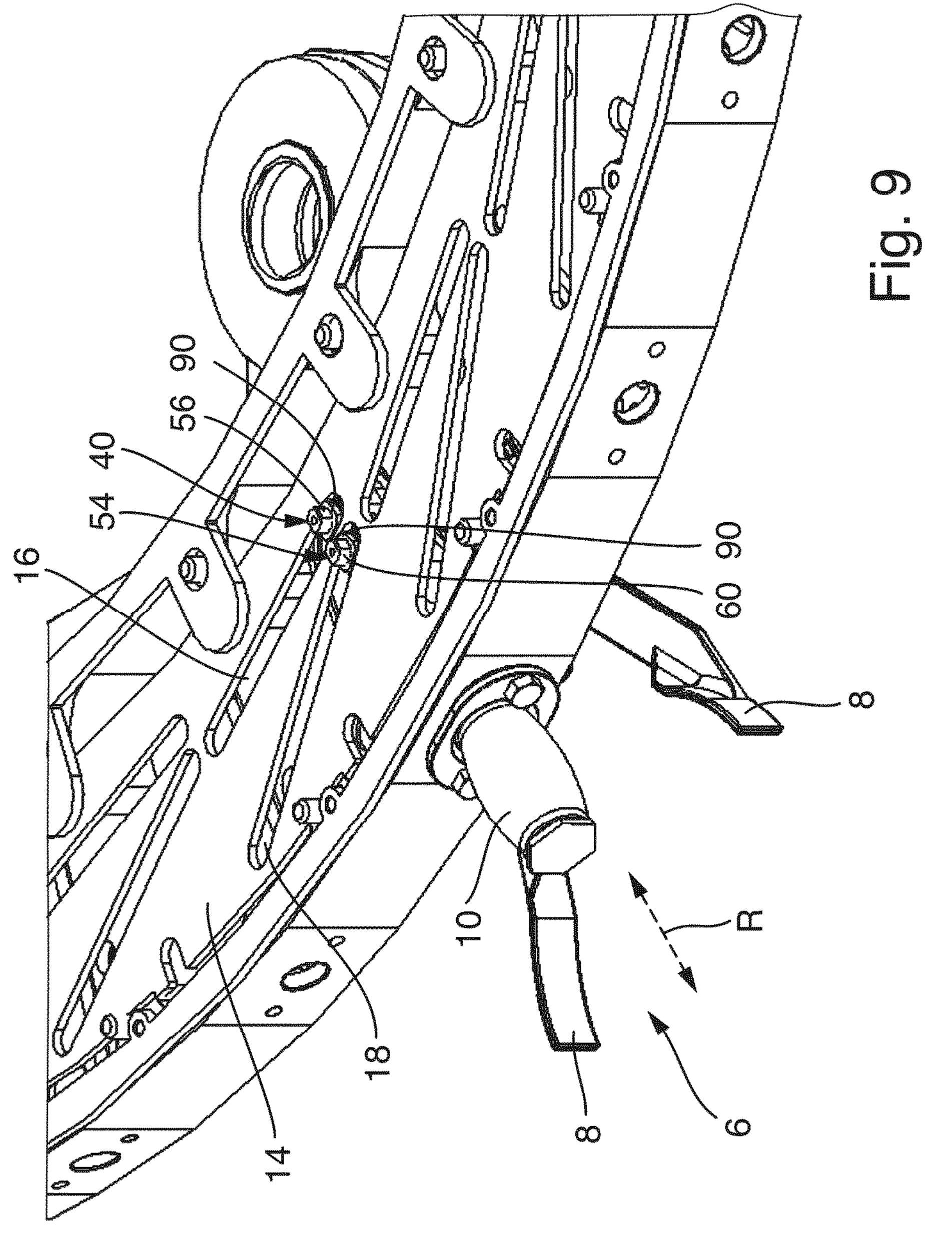
FIG. 9 schematically shows a perspective side view of the detail shown in FIG. 8.

Accordingly, the punch guide groove 18 is arranged radially outside the guide groove 16 in the disk segment 14, as can be seen in the schematic perspective side view in FIG. 9 of the detail shown in FIG. 8, which shows a perspective side view of the detail region of FIG. 8 with the disk segment 14 displayed. The punch guide shoulder 54 and guide shoulder 40 each comprise a rectangular slide element 90 with rounded corners, which element improves the guidance in the punch guide groove 18 or guide groove 16, in particular allows a small amount of play and provides anti-twisting protection.

The punch guide shoulder 54 and the guide shoulder 40 are not integrally attached to the punch 10 or adjustment part 28, but are rather attached as separate units to the punch 10 and adjustment part 28.

Figure 10:
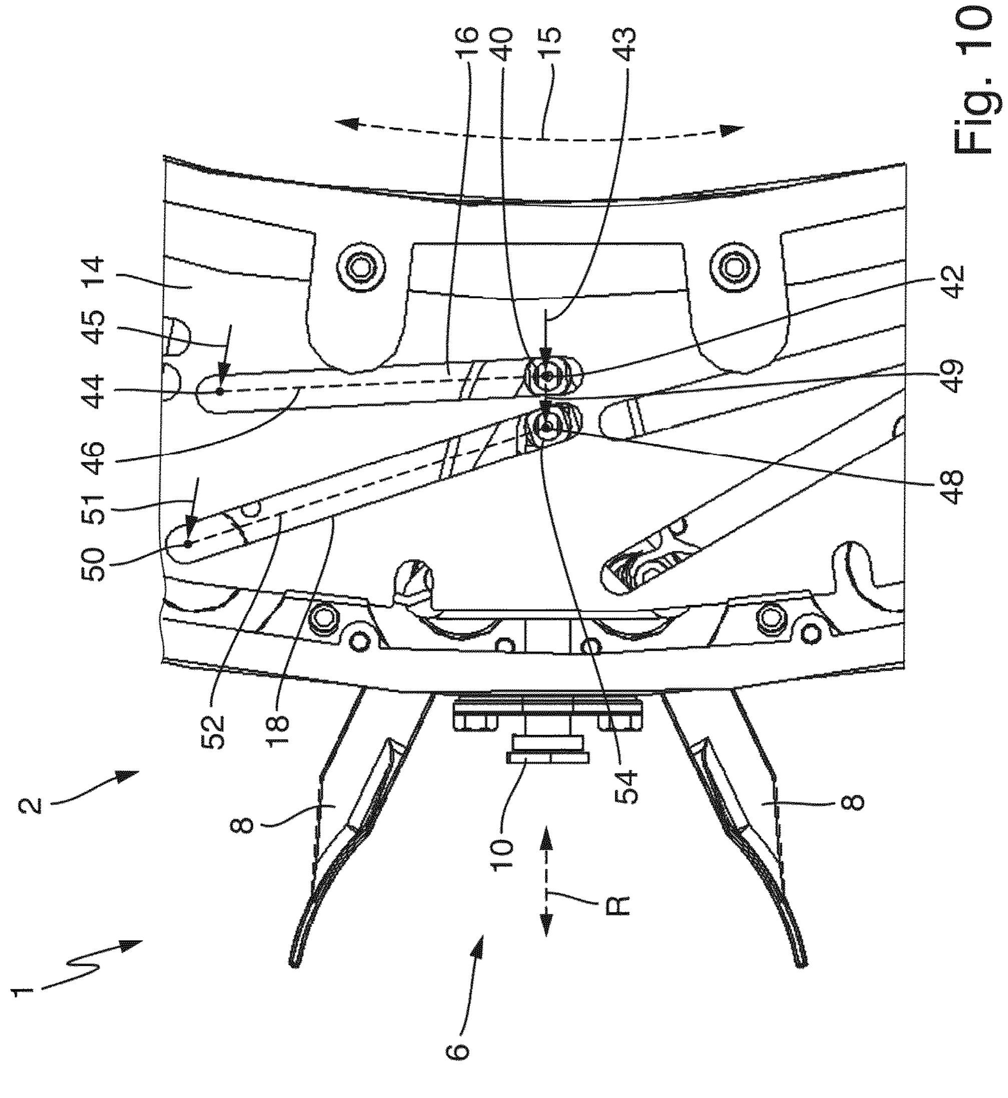
FIG. 10 shows a schematic top view of the detail region of FIG. 9.

FIG. 10 shows a schematic top view of the detail region of FIG. 9. The linear trajectory 52 of the punch guide groove 18 and the linear trajectory 46 of the guide groove 16 can be derived herefrom, as already described in detail above in connection with the previous embodiments.

Figure 11:
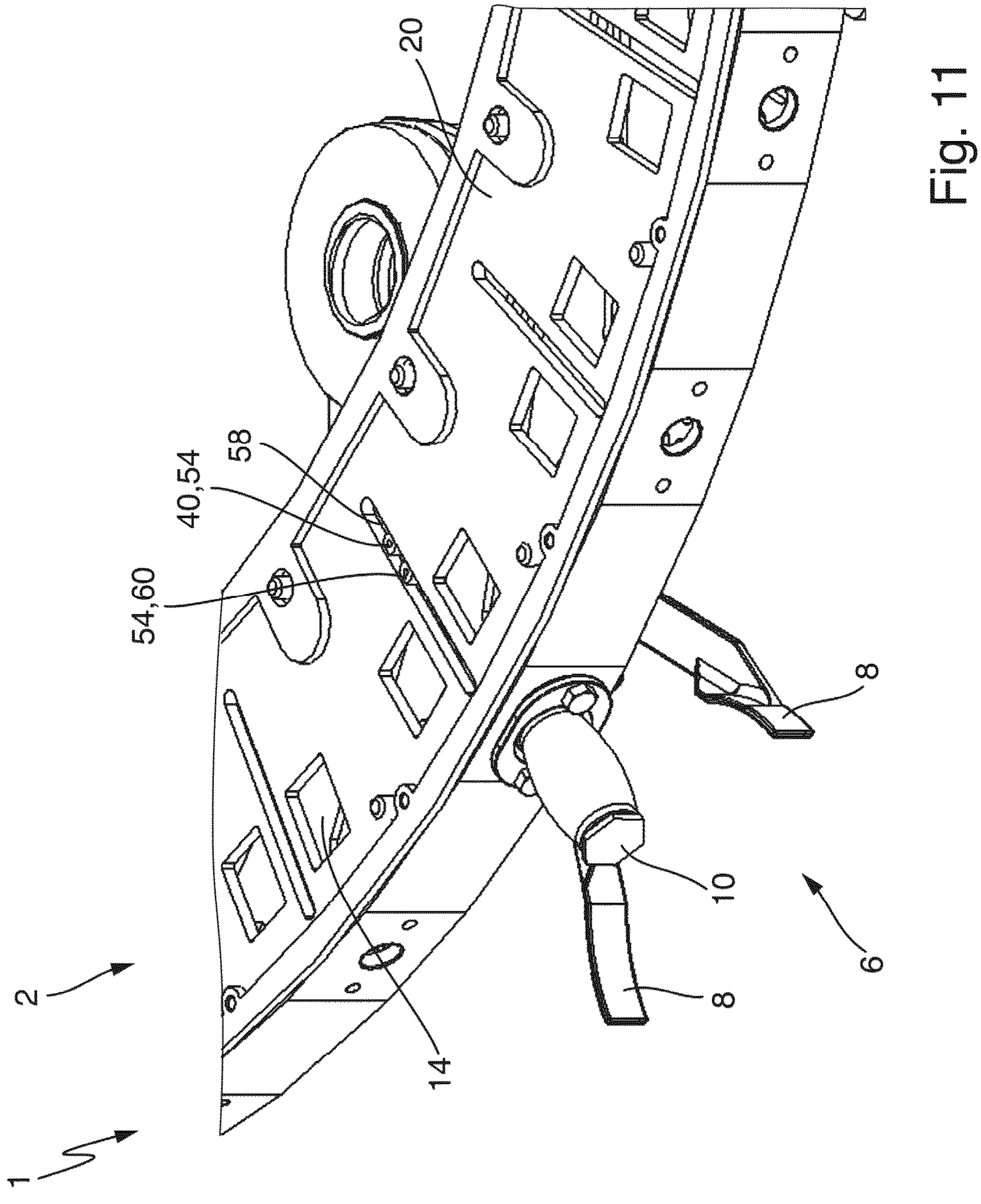
FIG. 11 schematically shows a perspective side view of the detail region of FIGS. 9 and 10.

FIG. 11 shows a schematic perspective side view of the detail region of FIGS. 9 and 10 with the upper plate segment 20 shown. It can be seen that in this embodiment the punch 10 and the adjustment part 28 are guided via a common radially oriented slot guide 58 in the upper plate segment 20.

The punch guide shoulder 54 moreover also comprises the guide portion 60 guided in the slot guide 28, and the guide shoulder 40 comprises the guide portion 56 guided in the slot guide 28.

Referring again to FIG. 7, actuating units of the individual conveyor segments 2 are indicated by reference sign 86. They are configured to adjust the position of the disk segment 14 relative to the adjustment parts 28 or to the upper and lower plate segments 20, 22. According to this embodiment, the disk segment 14 can comprise a toothed portion not shown herein, namely in this case on the radially inner side of the disk segment 14. It meshes with a worm gear pinion of the actuating unit 86 (not shown) inside the conveyor segment.

In a changeover mode which does not correspond to the conveying operation of the star wheel conveyor but interrupts the same, the position of the pocket arms 8 and punch 10, which position is fixed during conveyance, can be changed by moving the disk segment 14, which is fixed during conveyance, in the circumferential direction via the actuating unit 86. When the pockets 6 have the new, desired size, the disk segment 14 can be fixed again, for example by making the toothing between the disk segment and the pinion to be self-locking and/or by blocking the actuating unit, and then changing from the changeover mode to a conveying operation in which the pocket arms 8 and punch 10 of each pocket 6 are fixed.

Figure 12:
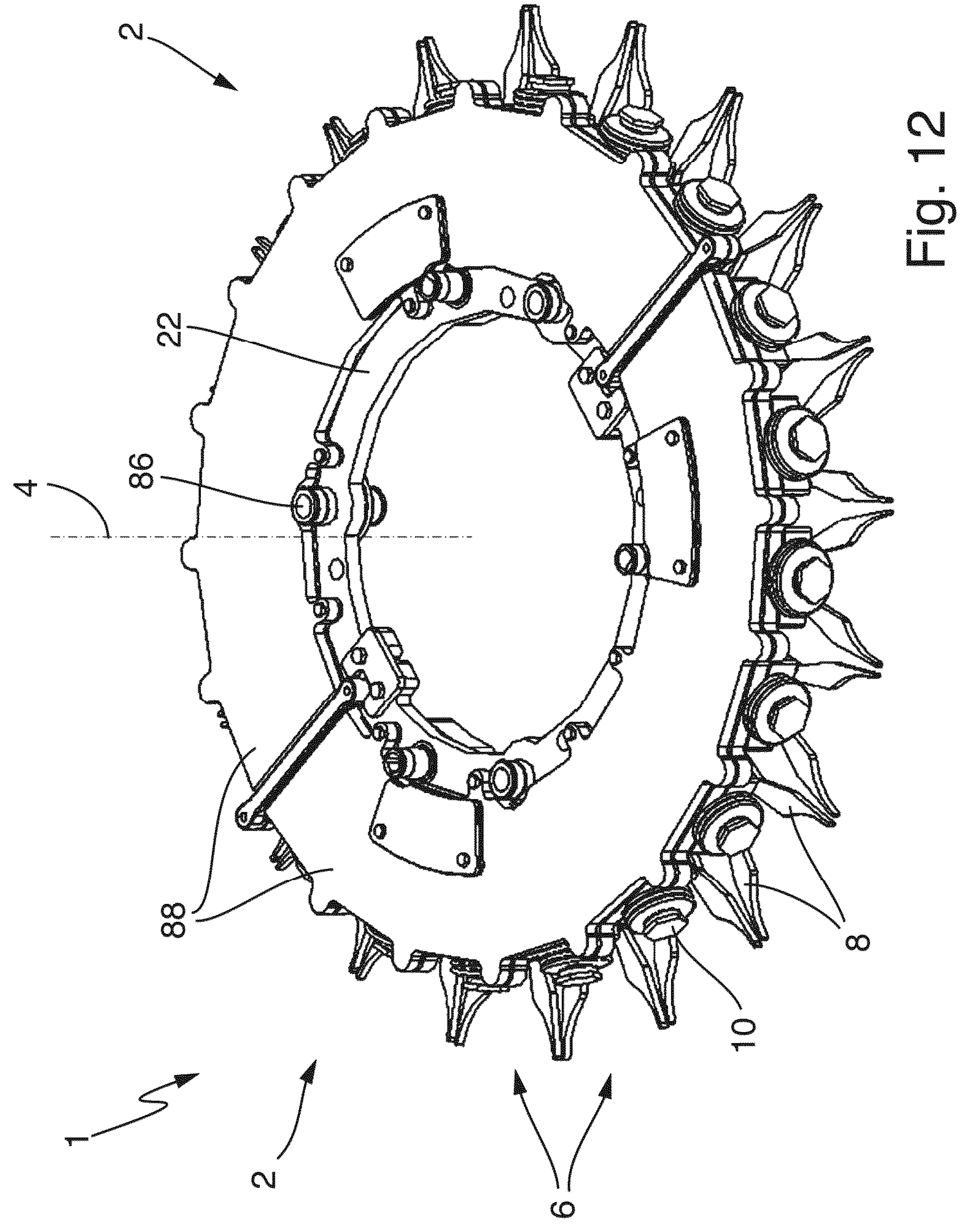
FIG. 12 schematically shows a perspective side view of a star wheel conveyor for conveying containers in a beverage filling system according to another embodiment.

FIG. 12 schematically shows a perspective side view of a star wheel conveyor 1 for conveying containers 78 in a beverage filling system according to another optional embodiment. The star wheel conveyor 1 substantially corresponds to that of FIGS. 7 to 11, wherein two conveyor segments 2 are provided here, each of which extends over an angle of extent of approximately 180° and which together form a conveyor wheel that is substantially continuous in the circumferential direction. The conveyor segments 2 are each sealed on all sides from the environment and connected to one another at the circumferential end faces. Each conveyor segment 2 has a cover plate 88 for the purpose of providing sealing from above.

Figure 13:
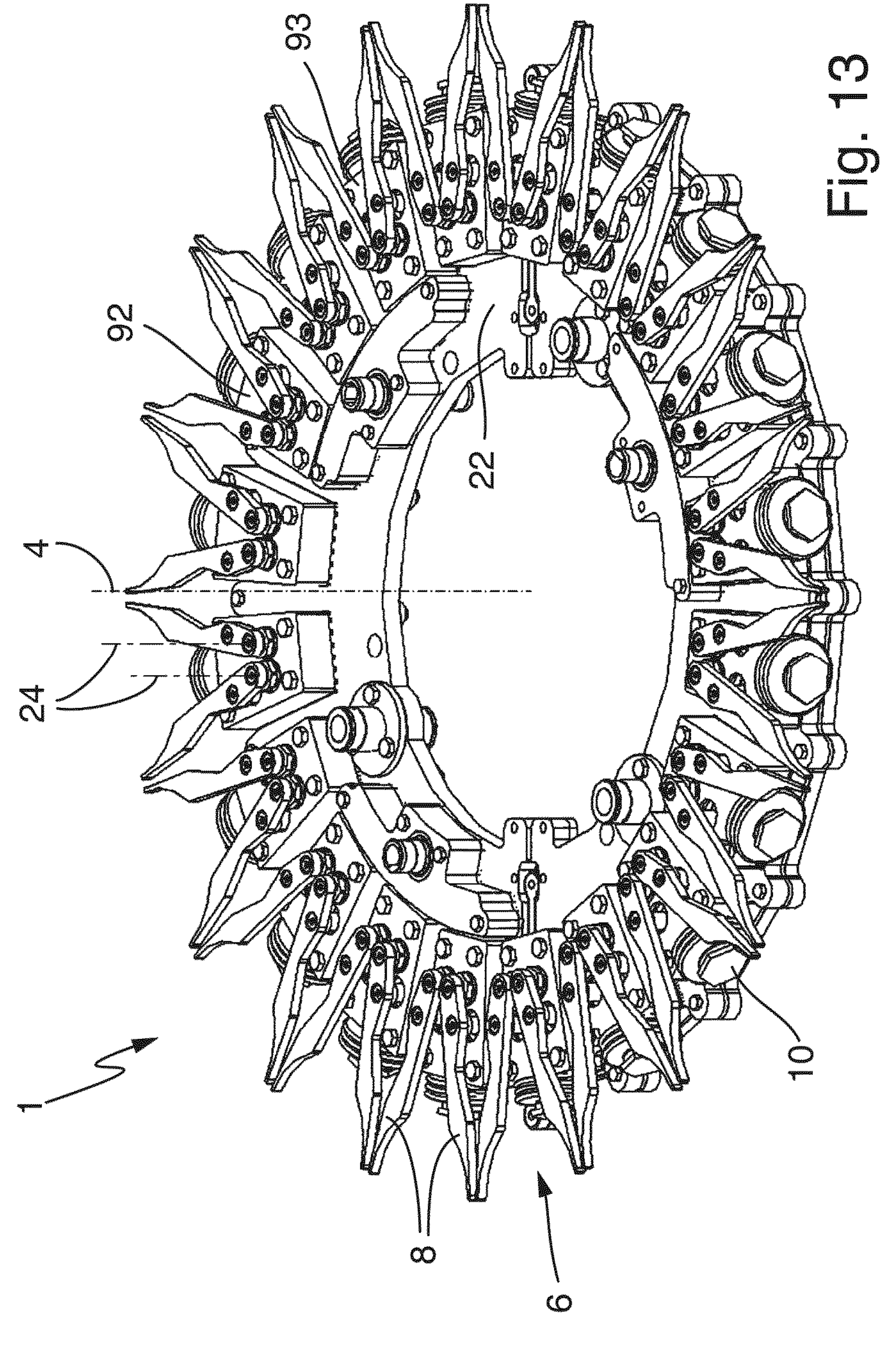
FIG. 13 schematically shows a perspective side view of the star wheel conveyor of FIG. 12 from below.

FIG. 13 schematically shows a perspective side view of the star wheel conveyor 1 of FIG. 12 from below. It can be seen that pocket units 92 are attached to the lower plate segment 22 from below.

The pocket units 92 comprise the pocket arms 8. The latter are pivotably mounted about the pivot axes 24 relative to a housing 93 of the pocket unit 92.

The pocket units 92 can be attached to the lower plate segment 22 from below by screwing the housing 93 to the lower pocket segment. The lower plate segment 22 and the housing are connected in a sealed manner, in this case via a flat seal (not shown).

Figure 14:
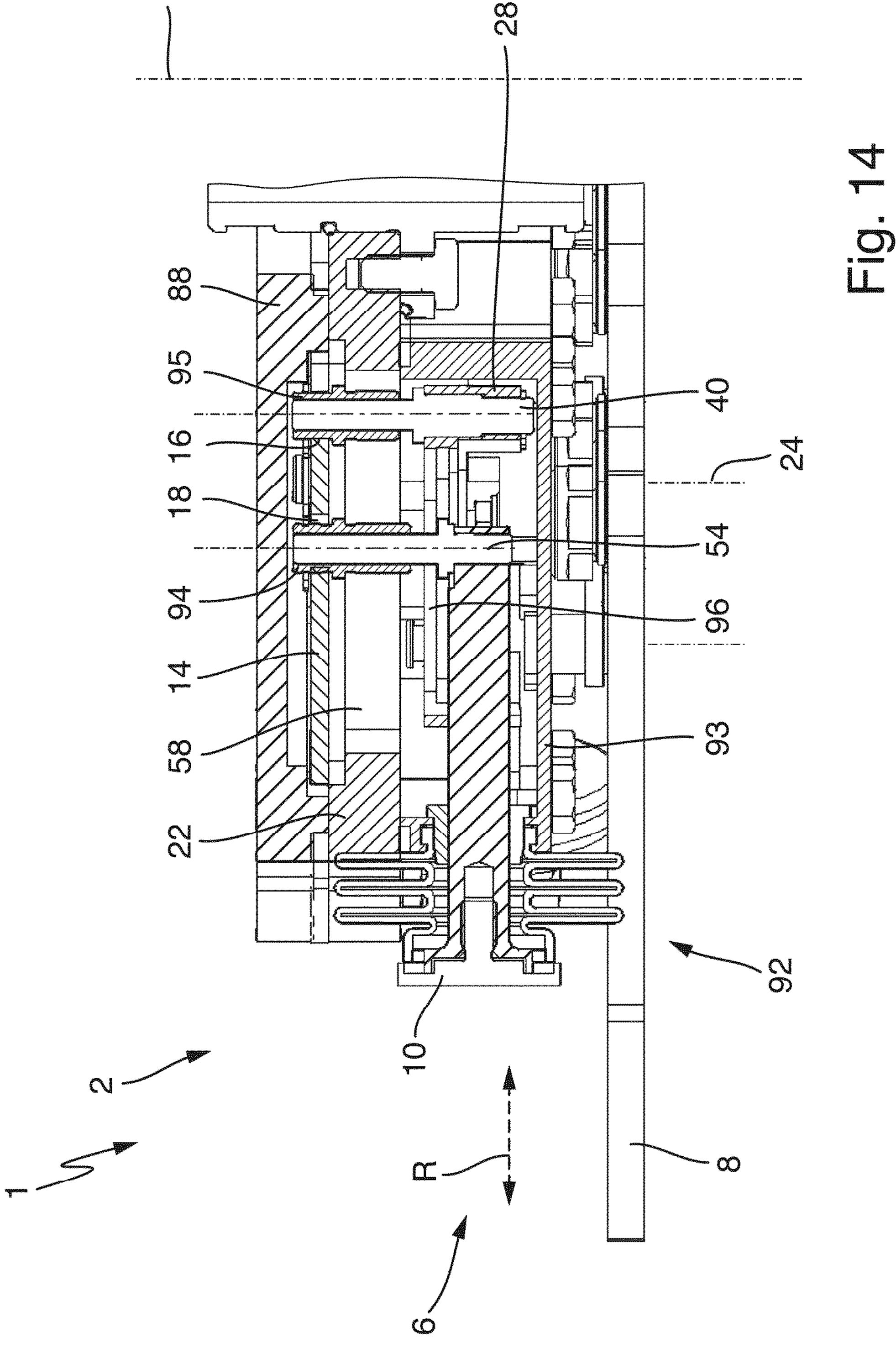
FIG. 14 schematically shows a sectional view through a pocket unit of the star wheel conveyor of FIGS. 12 and 13.

FIG. 14 schematically shows a sectional view in a plane defined by the radial direction R and the axis of rotation 4, centrally through a pocket 6. From this it can be seen that the adjustment part 28 is also accommodated in the housing 93 as a component of the pocket unit 92. With respect to the housing 93, the guide shoulder 40 and the punch guide shoulder 54, which are both configured as pins herein, extend in the direction of the axis of rotation 4 from the housing 93 toward and through the lower plate segment 22.

In this embodiment, the conveyor segments do not comprise an upper plate segment. Rather, the guide shoulder 40 and the punch guide shoulder 54 are guided in a slot guide 58 oriented in the radial direction R.

More precisely, two sleeves 94, 95 are guided in the slot guide 58. When attaching or changing a pocket unit 92 to/at the star wheel conveyor 1, the guide shoulder 40 is inserted into a first sleeve 95 and the punch guide shoulder 54 is inserted into a second sleeve 94. The sleeves 94, 95 are further guided in the guide groove 16 and punch guide groove 18, respectively. Accordingly, in the assembled state of conveyor segment 2 and pocket unit 92, the guide shoulder 40 and punch guide shoulder 54 are guided in the guide groove 16 and punch guide groove 18, respectively.

Figure 15:
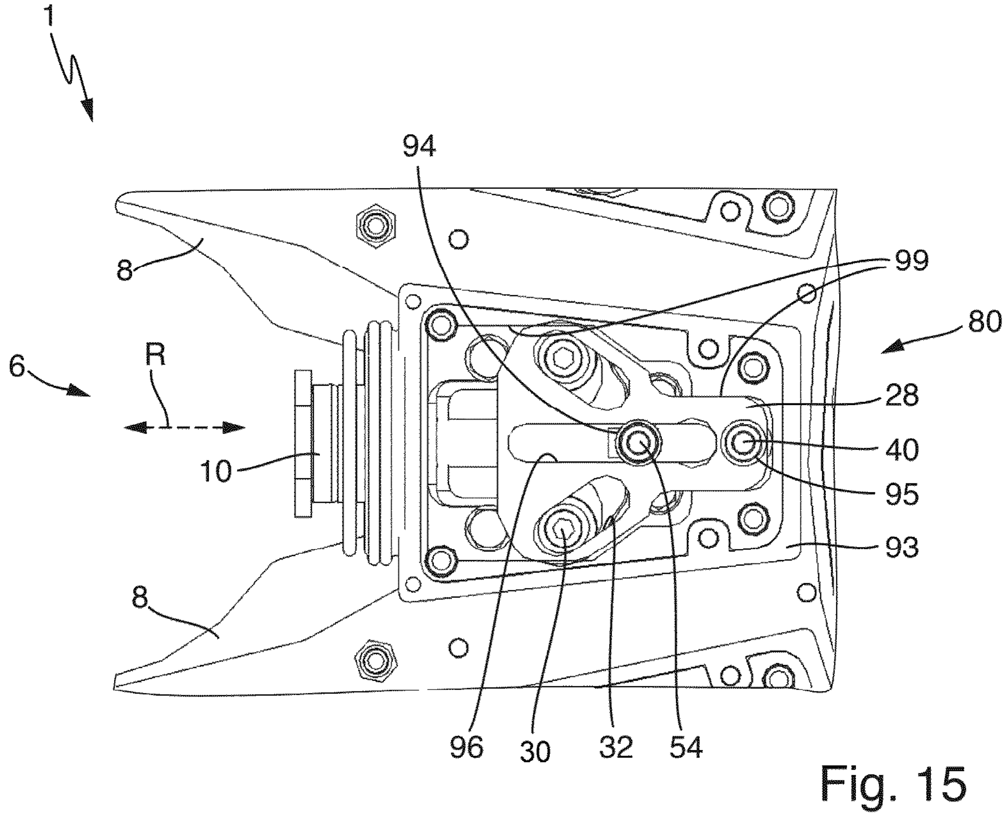
FIG. 15 schematically shows a top view of the pocket unit described in FIG. 14.

FIG. 15 schematically shows a top view of the pocket unit 93 described in FIG. 14. It can be seen that the adjustment part 28 is guided on both sides via a lateral guide 99 in the housing 93, so that the adjustment part 28 can be moved solely in the radial direction R.

Figure 16:
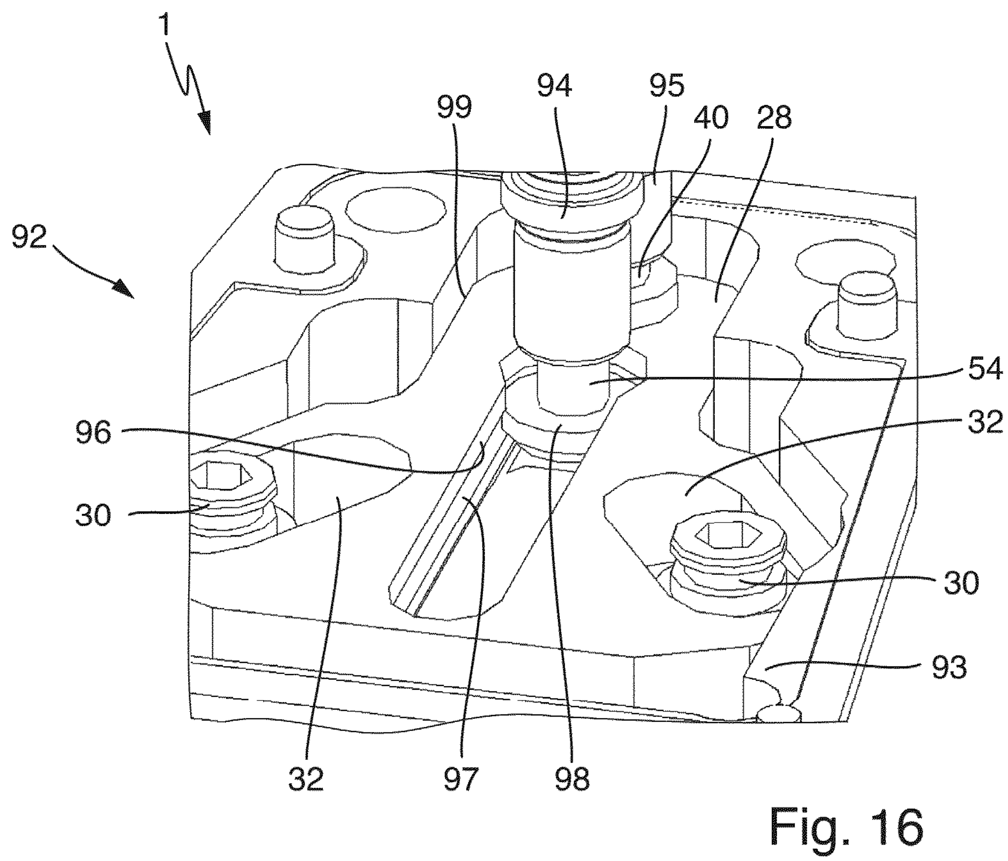
FIG. 16 schematically shows a perspective side view of the interior of the pocket unit of FIGS. 14 and 15.

FIG. 16 schematically shows a perspective side view of the interior of the pocket unit 92. The adjustment part 28 comprises a further groove 96 oriented in the radial direction R, in which the pin-shaped punch guide shoulder 54 is movable. The punch guide shoulder 54 comprises a collar 98 which is guided in collar grooves 97 extending in the opposite side walls of the groove 96. This can prevent the punch from twisting, especially if the pocket unit 92 is not attached to the conveyor segment 2 but instead is loose. This facilitates the assembly of the pocket unit 92 on the conveyor segment 2.

To the extent applicable, any of the individual features set forth in the exemplary embodiments may be combined and/or interchanged, without departing from the scope of the invention.

The invention claimed is:

1. A star wheel conveyor for conveying containers in a beverage filling system, comprising:

a conveyor segment rotatable about a central axis of rotation and at least one pair of pocket arms directed outward with respect to the axis of rotation for forming a pocket that at least partially receives a container to be conveyed, wherein each pocket arm is arranged on the circumference of the conveyor segment and is pivotable about a pivot axis oriented substantially parallel to the axis of rotation, wherein the pocket arms engage with an adjustment part, which is arranged on the conveyor segment and is radially displaceable with respect to the axis of rotation, such that a pocket width of the pocket is adjustable by displacing the adjustment part in a radial direction, wherein the conveyor segment comprises a seal which provides sealing in the radial direction between a pocket-forming region of the pocket arms and/or of a punch, which region is present radially outside the seal, and a conveyor segment interior which is present radially inside the seal, wherein the adjustment part, interaction elements, at least one disk segment, a guide shoulder, a punch guide shoulder, a guide groove and/or a punch guide groove are arranged inside the conveyor segment, wherein the seal is a seal running around the circumference of the conveyor segment and/or the seal is a diaphragm seal and/or a bellows-type seal, wherein the seal comprises at least one boot region and/or one bellows region, and wherein the seal extends entirely over the circumference relative to the axis of rotation.

2. The star wheel conveyor according to claim 1, wherein the two pocket arms of the pair of pocket arms forming the pocket are engageable with the adjustment part such that the pocket arms are pivotable in opposite directions to one another by displacing the adjustment part in the radial direction.

3. The star wheel conveyor according to claim 1, wherein the star wheel conveyor is configured such that the position of the pocket arms of the pair of pocket arms forming the pocket is presettable to a given position in a changeover mode and such that the pair of pocket arms is fixed in the preset position during a conveying operation in which containers to be conveyed are conveyed.

4. The star wheel conveyor according to claim 1, wherein the two pocket arms of the pair of pocket arms forming the pocket are engaged with the adjustment part such that when the adjustment part is displaced in a first direction, a direction pointing radially outward with respect to the axis of rotation, the pocket arms, a pocket portion of the pocket arms provided for forming the pocket, are pivoted toward one another, and when the adjustment part is displaced in a second direction opposite to the first direction, a direction pointing radially inward with respect to the axis of rotation, the pocket arms, their pocket portions provided for forming the pocket, are pivoted away from one another.

5. The star wheel conveyor according to claim 1, wherein the two pocket arms of the pair of pocket arms forming the pocket are engaged with the adjustment part each via an interaction element, wherein the interaction element is a pin element configured to engage in a slot groove in the adjustment part, wherein the interaction element is oriented parallel to the pivot axis of the pocket arm and/or extends parallel to the pivot axis of the pocket arm from the pocket arm, and/or wherein the interaction element is formed integrally with the pocket arm.

6. The star wheel conveyor according to claim 5, wherein the slot grooves are arranged in the adjustment part, with their respective longitudinal extension, each oriented at an angle to the direction of movement of the adjustment part, wherein the slot grooves are arranged axially symmetrically in the adjustment part, with respect to the direction of movement and/or a direction radial to the axis of rotation.

7. The star wheel conveyor according to claim 1, wherein the conveyor segment comprises a disk segment rotatable about the axis of rotation relative to the adjustment part, wherein the adjustment part engages with the disk segment such that a rotation of the disk segment about the axis of rotation relative to the adjustment part causes a displacement of the adjustment part in the radial direction.

8. The star wheel conveyor according to claim 7, wherein the disk segment comprises a guide groove in which a guide shoulder projecting from the adjustment part is guided, wherein the guide groove specifies a trajectory at least between a radial inner point and a radial outer point, wherein the trajectory extends obliquely outward with respect to the axis of rotation.

9. The star wheel conveyor according to claim 1, wherein a radially outwardly oriented punch is arranged between the pair of pocket arms, which punch is configured to form the pocket together with the pair of pocket arms, wherein the punch specifies in particular a depth of the pocket in the radial direction relative to the axis of rotation.

10. The star wheel conveyor according to claim 9, wherein the radial punch is arranged on the adjustment part, wherein the radial punch is formed integrally with the adjustment part.

11. The star wheel conveyor according to claim 9, wherein the radial punch is displaceable in the radial direction to the axis of rotation relative to the conveyor segment, the adjustment part and/or the pair of pocket arms, wherein the punch engages with a disk segment that is rotatable about the axis of rotation relative to the punch such that a rotation of the disk segment about the axis of rotation relative to the punch causes a displacement of the punch in the radial direction, wherein the punch and the adjustment part engage with the same disk segment.

12. The star wheel conveyor according to claim 11, wherein the disk segment engaging with the punch comprises a punch guide groove in which a punch guide shoulder projecting from the punch is guided, wherein the punch guide groove specifies a trajectory at least between a radial inner point and a radial outer point, wherein the trajectory of the punch guide groove extends obliquely outward with respect to the axis of rotation.

* * * * *